United States Patent [19]

Shiozaki

[11] Patent Number: 5,042,848

[45] Date of Patent: Aug. 27, 1991

[54] SWIVELABLE CONNECTOR FOR TUBULAR CONDUITS

[75] Inventor: Kotaro Shiozaki, Susono, Japan

[73] Assignees: Fujipura Seiko Co., Shizuoka; Daicel Hüls Ltd., Tokyo, both of Japan

[21] Appl. No.: 268,694

[22] Filed: Nov. 8, 1988

[30] Foreign Application Priority Data

Nov. 16, 1987 [JP] Japan ................................ 62-288997
Dec. 1, 1987 [JP] Japan ................................ 62-183627

[51] Int. Cl.⁵ ............................................. F16L 27/00
[52] U.S. Cl. .................................... 285/277; 285/323; 285/423
[58] Field of Search ............... 285/276, 277, 322, 323, 285/307, 308, 319, 921, 423

[56] References Cited

U.S. PATENT DOCUMENTS

| | | | |
|---|---|---|---|
| 2,848,255 | 8/1950 | Klein et al. | 285/276 X |
| 2,915,325 | 12/1959 | Foster | 285/276 |
| 3,909,046 | 9/1975 | Legris | 285/323 X |
| 4,220,361 | 9/1980 | Brandenberg | 285/921 X |
| 4,398,757 | 8/1983 | Floyd et al. | |
| 4,524,995 | 6/1985 | Bartholomew | |
| 4,588,214 | 5/1986 | Guest | 285/323 |
| 4,601,497 | 7/1986 | Bartholomew | |
| 4,637,640 | 1/1987 | Fournier | 285/319 |

FOREIGN PATENT DOCUMENTS 0031409 7/1981 European Pat. Off. .
3513189 10/1986 Fed. Rep. of Germany .
63-17390 2/1988 Japan .

*Primary Examiner*—Dave W. Arola
*Attorney, Agent, or Firm*—McAulay Fisher Nissen Goldberg & Kiel

[57] ABSTRACT

A swivelable connector for tubular conduits comprising first and second mutually insertable tubular connector members and a retainer for retaining the second tubular connector member in the first tubular connector member. The retainer comprises engaging members positionable around the second tubular connector member and in the first tubular connector member, urging members engageable with the outer surfaces of the engaging members along a relatively axial movement between the urging members and the engaging members, to radially urge the engaging members into engagement with the second tubular connector member. The urging members can be embodied by a stepped inner surface of the first tubular connector member associating with the movable engaging members, or by the movable urging members associating with the fixed engaging members.

20 Claims, 13 Drawing Sheets

SWIVELABLE CONNECTOR FOR TUBULAR CONDUITS

BACKGROUND OF THE INVENTION

1. Field of the Invention

The present invention relates to a quick connect swivelable connector for tubular conduits.

2. Description of the Related Art

Swivelable connectors are used in many applications for connecting hoses for supplying a fluid such as water or oil, and conventionally, connectors of the threaded type are typically used. Such connectors, however, require skill and time for assembly, and thus simpler connectors are demanded.

U.S. Pat. Nos. 4,524,995 and 4,601,497, issued to Bartholomew on June 25, 1985 and July 22, 1986, respectively, disclose a quick connect swivelable connector comprising a first tubular connector member (housing), a second tubular connector member (a tubular conduit) inserted in the first tubular connector member and having an annular projection, a sealing means between the first and second tubular connector members, and a resilient retainer secured to the first tubular connector member to engage with the annular projection of the second tubular connector member. The resilient retainer preferably comprises a pair of snapping jaws. In this connector, assembly can be easily carried out by securing the resilient retainer to the first tubular connector member and then inserting the second tubular connector member in the resilient retainer and in the first tubular connector member until the annular projection of the second tubular connector member passes beyond the resilient retainer, whereby the second tubular connector member cannot be disconnected from the first tubular connector member.

It is, of course, necessary to enlarge a portion of the first tubular connector member to allow insertion of the second tubular connector member in the first tubular connector member, but the annular projection of the second tubular connector member necessitates a greater enlargement of a corresponding portion of the first tubular connector member. Therefore, preferably the annular projection is eliminated to obtain a compact connector.

From this aspect, Japanese Unexamined Utility Model Publication No. 63-17390, published on Feb. 4, 1988 and filed by the inventor for this application, discloses a swivelable connector comprising a first tubular connector member, a second tubular connector member with an end portion inserted in the first tubular connector member and an annular groove on that end portion, and a retainer for retaining the second tubular connector member in the first tubular connector member. The first tubular connector member preferably has a plurality of apertures formed adjacent to the cylindrical outer end portion thereof in which the second tubular connector member is inserted. The retainer comprises a cylindrical base portion adapted to fit in the cylindrical outer end portion of the first tubular connector member and a plurality of pawls extending from the cylindrical base portion for resiliently engaging in the annular groove of the second tubular connector member. Each of the pawls has a portion insertable in the apertures of the first tubular connector member to axially retain the retainer in the first tubular connector member and a free end portion extending radially inward to engage in the annular groove of the second tubular connector member.

Therefore, it is possible to provide either an annular projection on the second tubular connector member, as described in U.S. Pat. Nos. 4,524,995 and 4,601,497, or an annular groove, as described in Japanese Publication No. 63-17390 to cooperate with the resilient retainer. Such an annular projection or an annular groove should have a blocking wall disposed transversely to a central axis of the second tubular connector member, as particularly referred to in U.S. Pat. No. 4,524,995. Namely, at least one of the side walls of the annular projection or the annular groove must be formed perpendicular to the central axis of the second tubular connector member to axially abut against the inner edges of the retainer. In this way, the height of the annular projection or the depth of the annular groove should be sufficient to ensure that the inner edges of the retainer does not slip over the annular projection or the annular groove. The problem that arises in this aspect is that, if the second tubular connector member is made of a thin walled pipe, it is difficult to form an annular projection having an enlarged height or an annular groove having an enlarged depth on the thin walled second tubular connector member and integrally therewith.

Further, in its original shape, the retainer is shaped such that the distance between the opposing pawls or jaws is smaller than the outer diameter of the second tubular connector member, so that it can resiliently engage with the second tubular connector member. Thus the inner edges of the retainer normally are strongly forced against the second tubular connector member, biting into the outer surface of the second tubular connector member and disturbing the rotatability of the second tubular connector member relative to the first tubular connector member.

SUMMARY OF THE INVENTION

An object of the present invention is to provide a swivelable connector having a compact shape and which can solve the above described problems, in which a retaining function can be obtained with a shorter engaging projection or groove on a tubular connector member to be retained.

A further object of the present invention is to provide a swivelable connector in which rotatability between connector members is ensured.

According to the present invention, there is provided a swivelable connector for tubular conduits comprising a first tubular connector member having a first end portion adapted to be connected to a tubular conduit and a second end portion, a second tubular connector member having a first end portion inserted in the second end portion of the first tubular connector member and a second end portion adapted to be connected to a further tubular conduit, and retaining means for retaining the second tubular connector member in the first tubular connector member. The retaining means comprises a plurality of engaging members positionable around the second tubular connector member and having an inner surface facing the second tubular connector member and an outer surface, urging means engageable with the outer surfaces of the engaging members along a relative axial movement between the urging means and the engaging members to radially urge the engaging members into engagement with the second tubular connector member, and securing means for securing the engaging members at a predetermined axial position in the first tubular connector member when the engaging members are engaged with the second tubular connector member.

With this arrangement, the engaging members are urged into engagement with the second tubular connector member along the relatively axial movement between the urging means and the engaging members, for example, by a wedge action between the urging means and the engaging members, and therefore, the engaging members are not required to provide a strong resilient retention upon engagement with the second tubular connector member, as required in the prior art retainers with radially prestressed pawls, and as a result, it is possible to house the engaging members in the compact first tubular connector member.

Preferably, the second tubular connector member has a configured annular portion comprising an annular projection or an annular groove. It is not necessary for this annular projection or annular groove to have a side wall perpendicular to the axis of the first tubular connector member, as required in the prior art arrangement, and only a small slope is needed, i.e., the diameter of the annular portion is reduced, since the retaining function can be ensured by the radial clamping force from the urging means, which is preferably an integral part of a member guided by the first tubular connector member.

In the preferred embodiment, the second end portion of the first tubular connector member has a stepped inner surface comprising, in series from the outer end thereof, a first inner surface portion having an inner diameter, a second intermediate inner surface portion having an inner diameter greater than the inner diameter of the first inner surface portion, and a third inner surface portion having an inner diameter greater than the inner diameter of the second inner surface portion. The engaging members are movable along an axis of the first tubular connector member so that the engaging members are retractable in the third inner surface portion when the engaging members are positioned in the third inner surface portion. The engaging members are urged radially inward into contact with the second intermediate inner surface portion to engage with the annular portion when the engaging members are positioned in the second intermediate inner surface portion; the second intermediate inner surface portion constituting the urging means. Also, the engaging members are prevented from moving beyond the first inner surface portion after the engaging members are urged by the second intermediate inner surface portion constituting the urging means; the first inner surface portion constituting the securing means.

Alternatively, the cylindrical base portion of the engaging members is fixedly secured to the first tubular connector member, the urging means being axially movable along the inner surface of the first tubular connector member between a first position in which the urging means is free from the engaging members and a second position in which the urging means engages with the outer surfaces of the engaging members to radially urge the engaging members into engagement with the second tubular connector member.

BRIEF DESCRIPTION OF THE DRAWINGS

The present invention will become more apparent from the following description of the preferred embodiments with reference to the accompanying drawings, in which.

DESCRIPTION OF THE PREFERRED EMBODIMENTS

Figure 1:
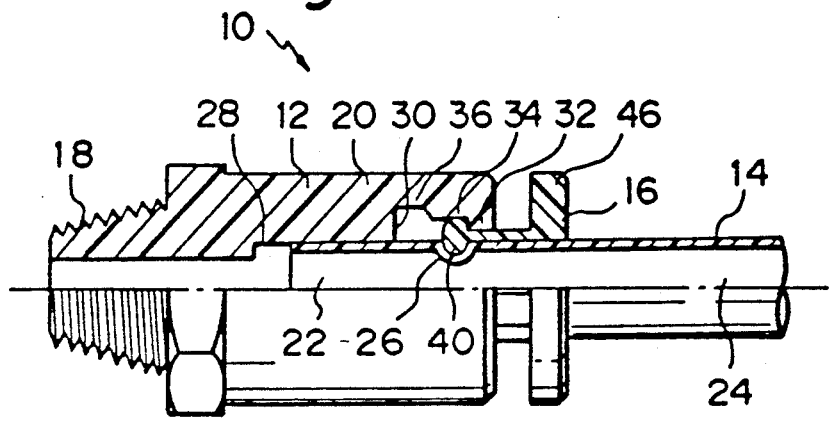
FIG. 1 is a partly sectional view of a swivelable connector according to the first embodiment of the present invention.

FIG. 1 shows a swivelable connector 10 according to the first embodiment of the present invention. The swivelable connector 10 comprises a first tubular connector member 12, a second tubular connector member 14, and a retainer 16. The first and second tubular connector members 12 and 14 and the retainer 16 can be made of a plastic material or a metallic material. It will be apparent that the swivelable connector 10 is used to couple hoses or pipes together, and to this end, the first tubular connector member 12 has a first end portion 18 adapted to be connected to a hose or a pipe and a second end portion 20, in which a first end portion 22 of the second tubular connector member 14 is inserted. The second end portion 24 of the second tubular connector member 14 is adapted to be connected to a further hose or a pipe. The second tubular connector member 14 has an annular groove 26 having a rounded shade in cross section On the outer surface thereof at a predetermined distance from the outer end thereof, for retention by the retainer 16.

Figure 2:
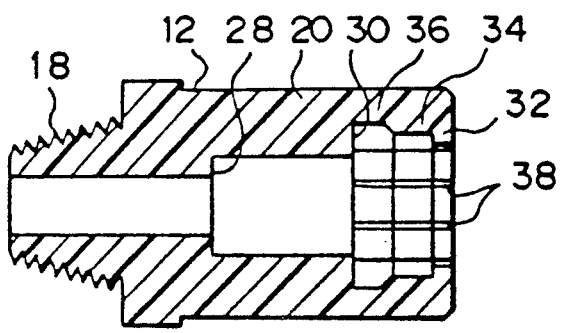
FIG. 2 is a sectional view of the first tubular connector member of FIG. 1.
Figure 9:
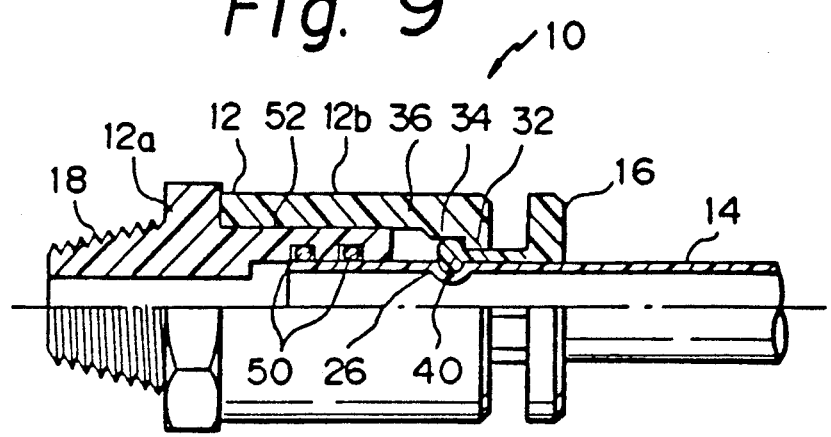
FIG. 9 is a partly sectional view of a modification of a swivelable connector of FIG. 1.

As shown in FIGS. 1 and 2, the first tubular connector member 12 includes a first central shoulder 28 from which the inner diameter of the second end portion 20 is enlarged relative to the remaining portion of the first tubular connector member 12. The inner diameter of the second end portion 20 of the first tubular connector member 12 is generally equal to the outer diameter of the first end portion 22 of the second tubular connector member 14, and therefore, the first can be guidingly inserted in the second end portion 20 of the first tubular connector member 12, and a sealing ring 50 can be arranged at this area, as shown in FIG. 9. The first tubular connector member 12 also includes a second shoulder 30 from which the inner diameter of the second end portion 20 is further enlarged.

This enlarged outer end portion 20 has a stepped inner surface or a stepped bore surface comprising, in series from the outer end thereof, a first inner surface portion 32 having a first inner diameter, a second intermediate inner surface portion 34, and a third inner surface portion 36. The first inner diameter of the first inner surface portion 32 is slightly greater than the outer diameter of the first end portion 22 of the second tubular connector member 14, to provide an annular clearance therebetween and allow the retainer 16 to move therein. The second inner diameter of the second intermediate inner surface portion 34 is greater than the first inner diameter of the first inner surface portion 32, and in turn, the third inner diameter of the third inner surface portion 36 is greater than the second inner diameter of the second intermediate surface portion 34. The step between the second intermediate inner surface portion 34 and the third inner surface portion 36 is tapered. Also, ribs 38 extend axially in this enlarged outer end portion.

Figure 3:
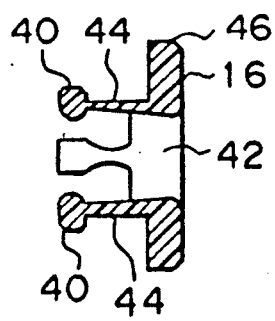
FIG. 3 is a sectional view of the retainer of FIG. 1.
Figure 4:
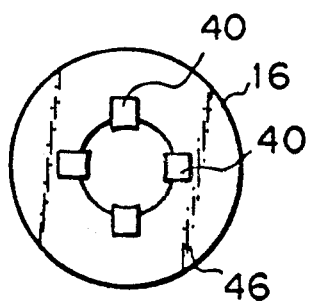
FIG. 4 is a front elevational view of the retainer of FIG. 3.
Figure 5:
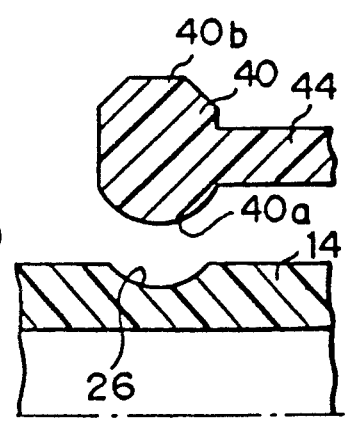
FIG. 5 is an enlarged view of a part of the retainer of FIG. 1.

As shown in FIGS. 1, 3 and 4, the retainer 16 comprises a plurality of engaging members 40 integrally formed with a cylindrical base portion 42 via legs 44. The cylindrical base portion 42 has a central hole for passing the second tubular connector member 14 therethrough when assembled. The legs 44 with the engaging members 40 extend to one side from the cylindrical base portion 42 substantially in parallel to each other around the second tubular connector member 14. Each of the engaging members 40 has an inner surface 40a facing the second tubular connector member 14 and an outer surface 40b. In this case, the inner surface 40a is shaped to fit in the annular groove 26, as shown in FIG. 5. The inner surface 40a may have a predetermined circumferential length with the same curvature as that of the outer diameter of the annular groove 26. Also, the cylindrical base portion 42 has a radially outer flange 46 for manual operation.

Figure 6:
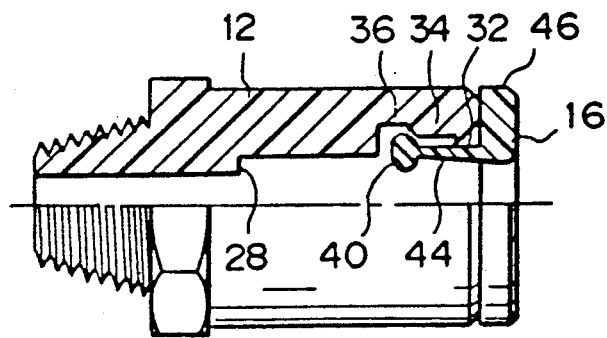
FIGS. 6 to 8 are views of the swivelable connector of FIG. 1 under different operational conditions.

This retainer 16 is movable along an axis of the first tubular connector member 12. The engaging members 40 can be inserted in the first tubular connector member 12 beyond the first inner surface portion 32 by resiliently deforming the legs 44 before the second tubular connector member 14 is inserted in the first tubular connector member 12. Then the engaging members 40 can be freely retracted in the third inner surface portion 36 of the first tubular connector member 12 when the engaging members 40 are axially positioned in the third inner surface portion 36, as shown in FIG. 6.

Figure 7:
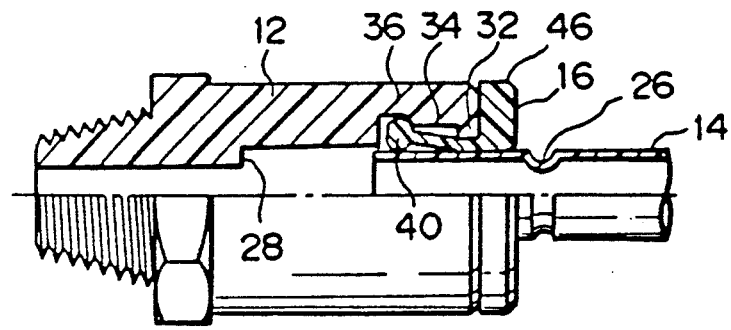
Figure 8:
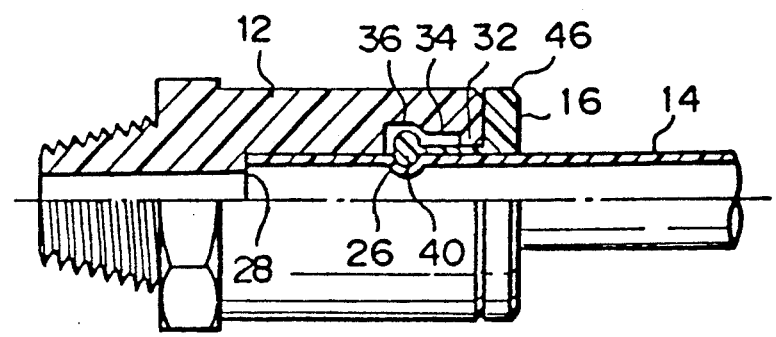

The second tubular connector member 14 is then inserted into the first tubular connector member 12, as shown in FIG. 7, and the engaging members 40 can be further retracted in the third inner surface portion 36 in contact with the second tubular connector member 14. Upon completion of the insertion of the second tubular connector member 14, the end of the second tubular connector member 14 abuts against the first shoulder 28 of the first tubular connector member 12 and the engaging members 40 may engage in the annular groove 26 of the second tubular connector member 14, as shown in FIG. 8. In this case, however, the engaging members 40 do not apply sufficient urging force on the second tubular connector member 14, to retain the same in the first tubular connector member 12.

As shown in FIG. 1, the retainer 16 is then pulled outward together with the second tubular connector member 14. The engaging members 40 come in contact with and are under a compression force from the second intermediate inner surface portion 34 due to the relative dimensions therebetween causing a wedge action. Therefore, the engaging members 40 are forcibly engaged in the annular groove 26. In this position, the engaging members 40 are prevented from moving beyond the first inner surface portion 32 of the first tubular connector member 12 even if the second tubular connector member 14 is pulled outward, to thereby retain the second tubular connector member 14 in the first tubular connector member 12.

Note, the engaging members 40 are urged mechanically by the second intermediate surface portion 34 and the radial inner positions of the engaging members 40 are determined depending on the second inner diameter of the second intermediate surface portion 34. That is, the engaging members 40 do not stick in the bottom wall of the annular groove 26 and allow the second tubular connector member 14 to freely rotate.

Referring to FIG. 9, in the modification of the swivelable connector 10, a (or a plurality of) sealing ring(s) 50 is arranged between the first and second tubular connector members 12 and 14. The first tubular connector member 12 is comprised of two axially coupled tubular members 12a and 12b. The two axially tubular members 12a and 12b are press-fitted, and further fastened by a resiliently deformable detent projection 52; one member 12a having the tube connecting means 18 and the other member 12b having the stepped inner surfaces 32, 34, and 36.

Figure 10:
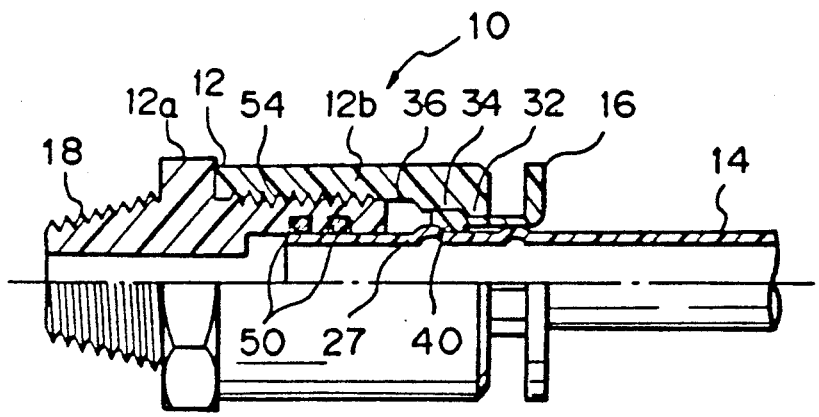
FIG. 10 is a partly sectional view of a further modification of a swivelable connector of FIG. 1.

Referring to FIG. 10, in the further modification of the swivelable connector 10, the first tubular connector member 12 is comprised of two tubular member 12a and 12b, threaded at 54.

In this example, the second tubular connector member 14 has an annular projection 27 instead of the annular groove 26 in FIG. 1. The first tubular connector member 12 has similar stepped inner surfaces 32, 34, and 36 and the retainer 16 has engaging members 40 similar to those elements in FIG. 1. The inner surface of each of the engaging members 40 fits the annular projection 27, but the shape of the inner surface of each of the engaging members 40 is not important for the present invention. Where the second tubular connector member 14 has a configured annular portion, such as the annular projection 27 or the annular groove 26, the configured annular portion or a part thereof must have a diameter that reduces from a first outer point (the top of the annular projection 27 or the outer edge of the annular groove 26) to a second point (the inner edge of the annular projection 27 or the bottom of the annular groove 26) on the first end portion 22 of the second tubular connector member 14, to effect retention of the second tubular connector member 14 by the engaging members 40 against any pulling force thereon.

Figure 11:
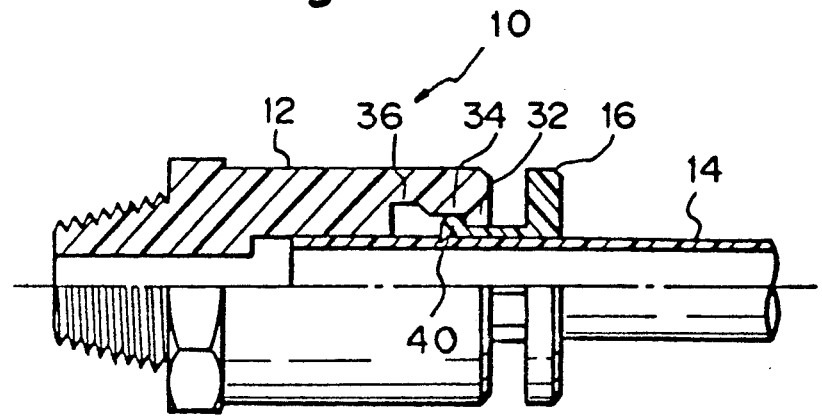
FIGS. 11 and 12 are views of a further modification of a swivelable connector of FIG. 1 under different operational conditions.
Figure 12:
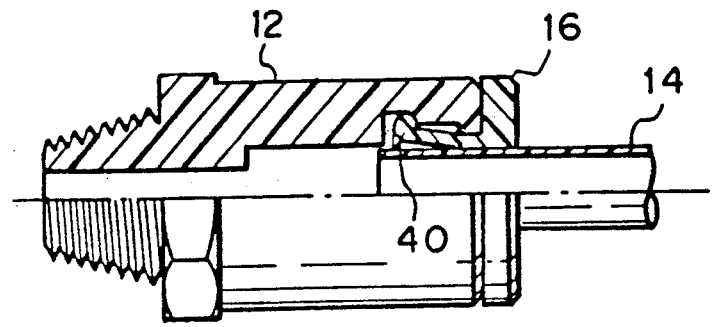
Figure 13:
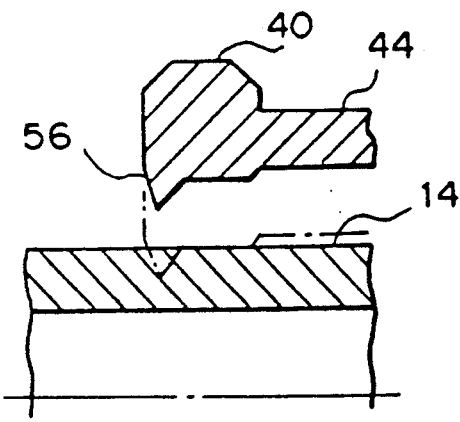
FIG. 13 is a enlarged view of a part of the retainer of FIGS. 11 and 12.

It is also possible, according to the present invention, to eliminate the configured annular portions, such as the annular projection 27 or the annular groove 26, from the second tubular connector member and to use an even-profiled second tubular connector member 14 as shown in FIGS. 11 to 13. In this case, each of the engaging members 40 preferably has an inward edge or teeth 56 which can bite into the outer surface of the second tubular connector member 14, as shown in FIG. 13, when the engaging members 40 are urged by the second intermediate inner surface portion 34 of the first tubular connector member 12. This example is adapted for the second tubular connector member 14 made of a relatively soft metal, such as copper.

Figure 15:
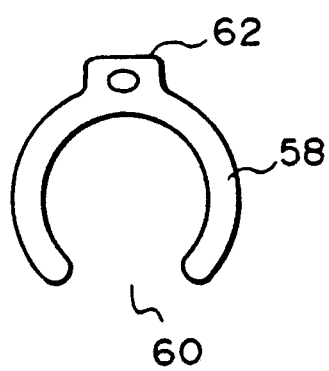
FIG. 15 is a plan view of the snap ring of FIG. 14.
Figure 14:
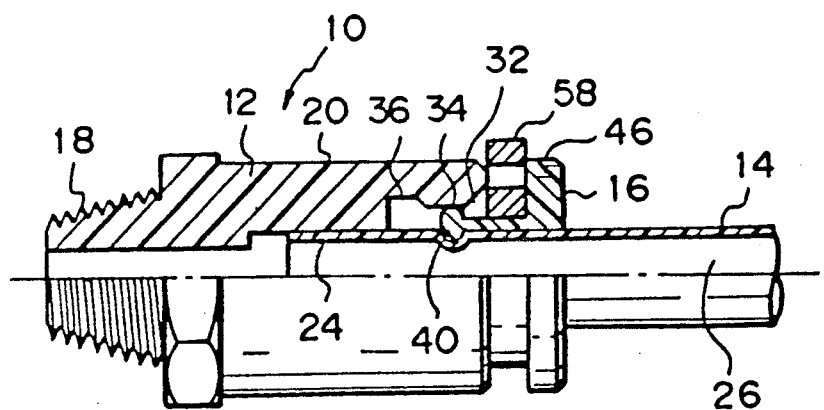
FIG. 14 is a partly sectional view of a further modification of a swivelable connector of FIG. 1, with a snap ring attached on the second tubular connector member.

In FIG. 14, a snap ring 58 is attached on the second tubular connector member 14 between the outer end of the second end portion 20 of the first tubular connector member 12 and the radially outer flange 46 of the cylindrical base portion 42 (see FIG. 3) of the retainer 16 to fill a space therebetween, which appears when the retainer 16 and the second tubular connector member 14 are pulled relative to the first tubular connector member 12 to cause the engaging members 40 to be urged by the second intermediate inner surface portion 34 and to prevent it from moving beyond the first inner surface portion 32. As shown in FIG. 15, the snap ring 58 has a gap 60 to thereby allow a snap fit thereof on the second tubular connector member 14, and a handling tab 62 which may project from the outer surface of the first tubular connector member 12 and the radially outer flange 46. Thus the snap ring 58 locks the engaging members 40 in the retaining position and provides a visual inspection which shows that the engaging members 40 are firmly in the retaining position. In this regard, the snap ring 58 can be a different color from that of the first tubular connector member 12 and the retainer 16.

Figure 16:
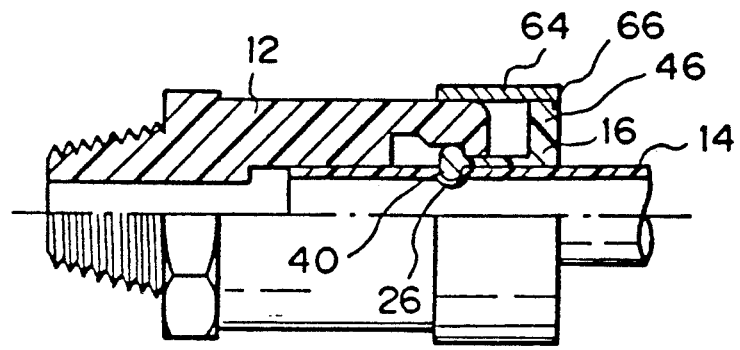
FIGS. 16 and 17 are partly sectional views of a further modification of a swivelable connector of FIG. 1 under different operational conditions, with an attachment cylindrical cover attached on the retainer.
Figure 17:
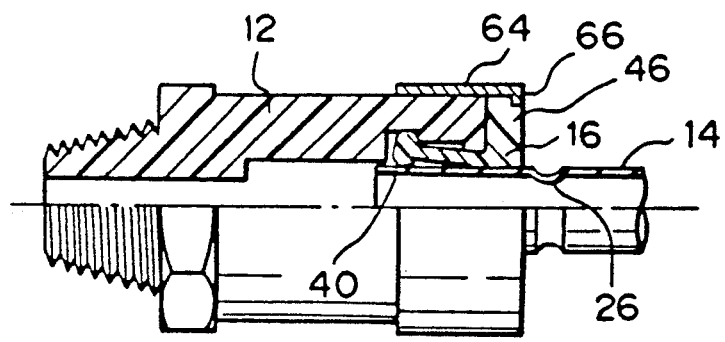

In FIGS. 16 and 17, an attachment cylindrical cover 64 is attached on the radially outer flange 46 of the cylindrical base portion 42. The attachment cylindrical cover 64 has an inner diameter slightly greater than the outer diameter of the first tubular connector member 12 and a length sufficient to extend along the outer surface of the first tubular connector member 12 and thereby cover a space therebetween. The attachment cylindrical cover 64 preferably has circumferentially spaced inward tabs 66, which can be snap-fitted onto the corresponding groove on the outer end of the radially outer flange 46 of the cylindrical base portion 42. This attachment cylindrical cover 64 can be used to aid the assembly and disassembly of the swivelable connector 10.

Referring to FIGS. 18 to 22, the second embodiment of the present invention is described, in which the cylindrical base portion 42 of the engaging members 40 is fixedly secured to the first tubular connector member 12 and an urging means 70 is axially movable along the inner surface of the first tubular connector member 12. In this example, the second tubular connector member 14 has the annular projection and the retainer 16 has engaging members 40 similar to those in FIG. 10. The first tubular connector member 12 is comprised of two axially coupled elements 12a and 12b and the radially outer flange 46 of the cylindrical base portion 42 of the engaging members 40 is clamped between the inner end of the first member 12a and an inner flange 12c of the second member 12b inboard of the first tubular connector member 12, with the engaging members 40 directed to the outer end of the first tubular connector member.

Figure 22:
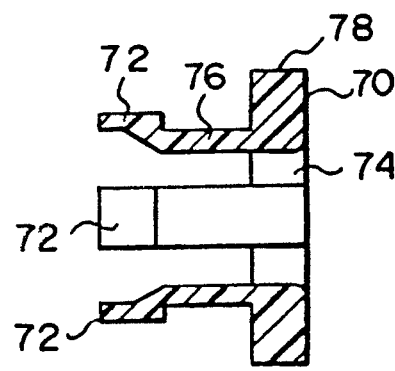
FIG. 22 is a sectional view of the urging means of FIGS. 18 to 20.

As shown in FIG. 22, the urging means 70 comprises a plurality of urging members 72 extending integrally from a cylindrical base portion 74 having a center hole for passing the second tubular connector member 14 therethrough via legs 76. The number and shape of the urging members 72 are formed in correspondence with the engaging members 40 so that each of urging members 72 is capable of urging each of the engaging members 40, respectively. A radially outer flange is provided on the cylindrical base portion 74 for manual operation thereof.

Figure 18:
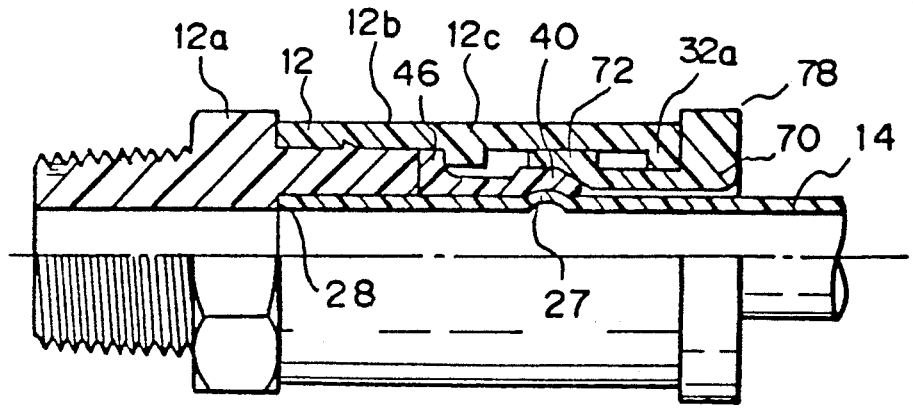
FIGS. 18 to 20 are partly sectional views of a swivelable connector according to the second embodiment of the present invention.
Figure 19:
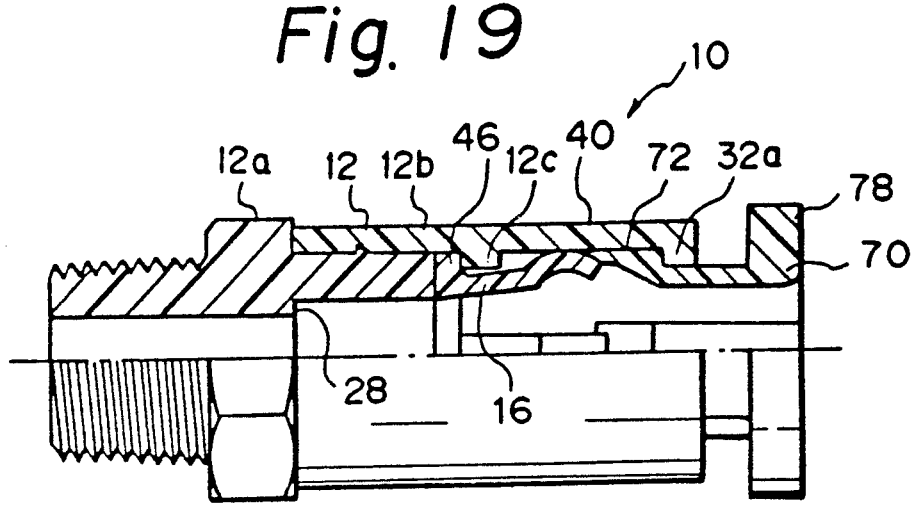
Figure 20:
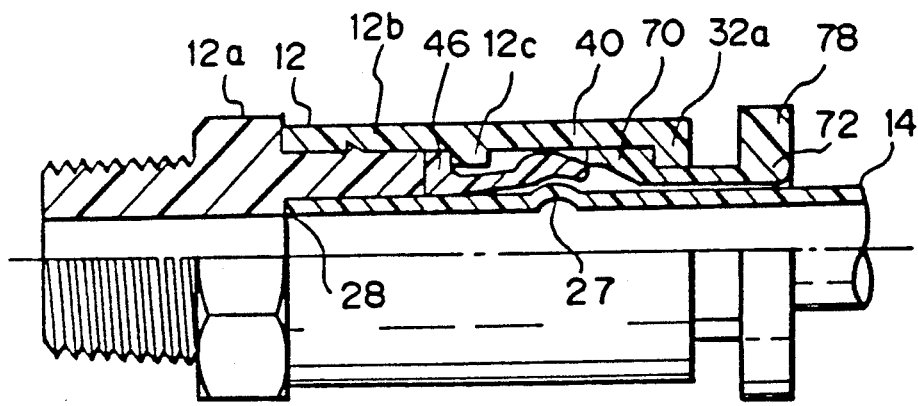

The urging members 72 can be resiliently inserted in the first tubular connector member 12, similar to the engaging members 40 in the previous embodiment, and movable therein a sliding engagement therewith. The urging members 12 can take a first position near the outer end of the first tubular connector member 12, as shown in FIG. 19, in which the urging members 72 are free from the engaging members 40, and the second tubular connector member then inserted in the first tubular connector member 12, as shown in FIG. 20. Then the urging members 72 are moved to a second advanced position, as shown in FIG. 18, in which the urging members 72 engage with the outer surfaces of the engaging members 40 to radially urge the engaging members 40 into engagement with the annular projection of the second tubular connector member 14. The first tubular connector member 12 has a radially inner flange 32a which is similar to the first inner surface portion 32 of the previous embodiment.

With this embodiment, assembly is completed when the second tubular connector member 14 is fully inserted to abut against the shoulder 28 in the first tubular connector member 12 and the urging means 70 is fully inserted so that the radially outer flange 78 thereof abuts against the outer end of the first tubular connector member 12, as shown in FIG. 18. Therefore, the once assembled connector 10 cannot be accidentally disassembled, compared to the structure of FIG. 1 in which one of the second tubular connector member 14 and the engaging member 40 may be accidentally disconnected and thus a lock means such as the snap ring 58 may be needed.

Figure 23:
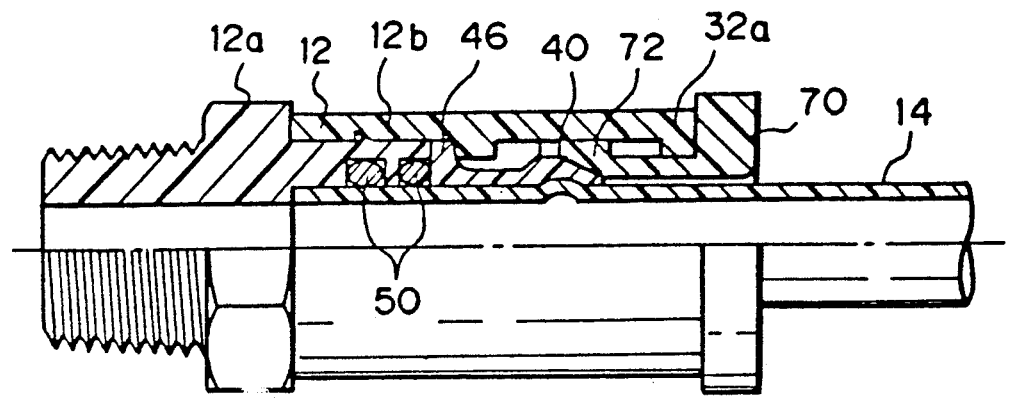
FIGS. 23 to 25 are sectional views of modifications of a swivelable connector of FIGS. 18 to 20, respectively.
Figure 24:
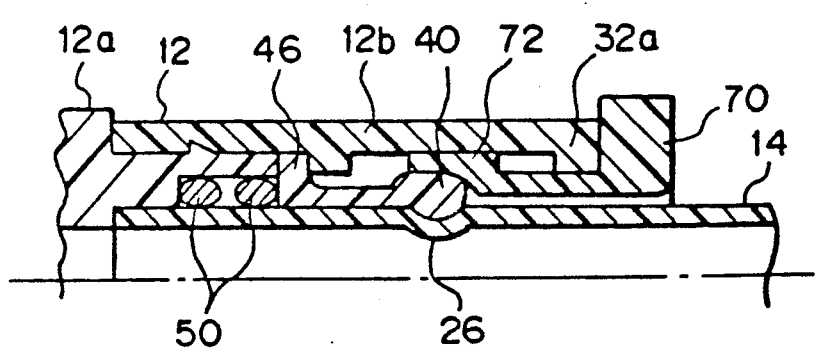
Figure 25:
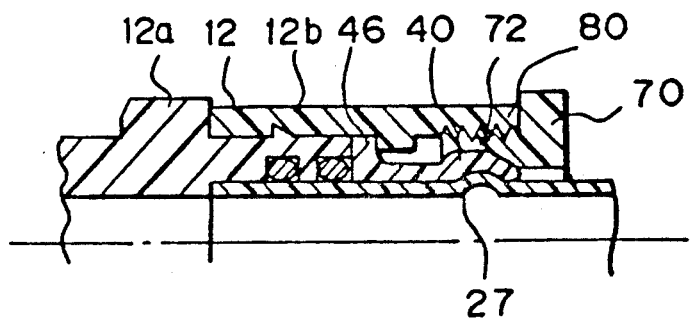

FIG. 23 shows the use of sealing rings 50 between the first and second tubular connector members 12 and 14, FIG. 24 shows the use of the annular groove 26 on the outer surface of the second tubular connector member 14, and FIG. 25 shows that the urging means 70 is threaded to the first tubular connector member 12 at 80 so that the urging means 70 cannot move axially.

Figure 26:
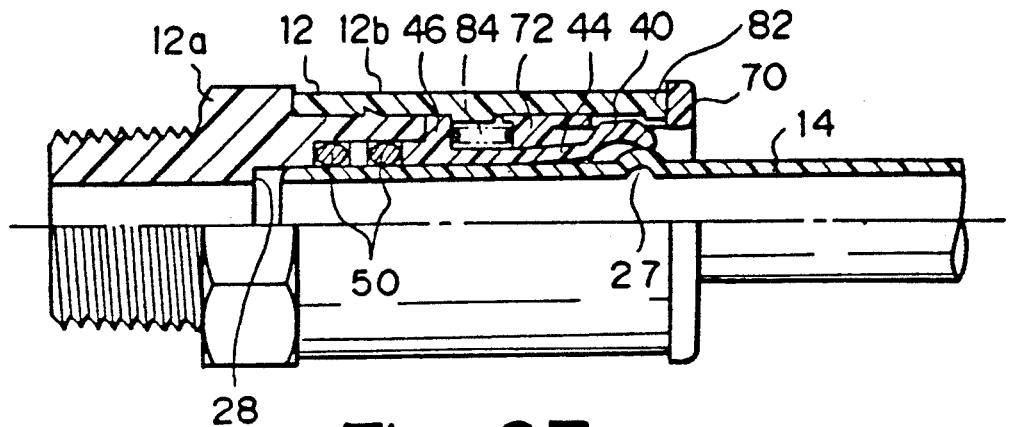
FIGS. 26 and 27 are sectional views of a further modification of a swivelable connector of FIGS. 18 to 20 under different operational conditions.
Figure 27:
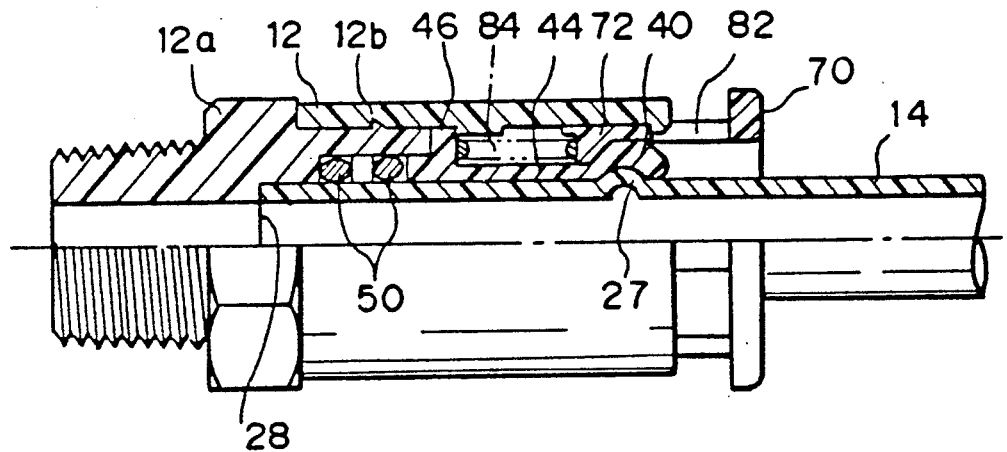

FIGS. 26 to 29 show a modification of the second embodiment according to the present invention, in which the urging elements 72 are arranged between the engaging members 40 and the radially outer flange 46 of the cylindrical base portion 42 thereof, so that the urging members 72 are capable of moving toward and urging the engaging members 40. In this case, in a manner similar to that shown and discussed in connection with FIGS. 14 and 15 and FIGS. 16 and 17 the radially outer flange 78 of the urging means is pulled away from the outer ends of the first tubular connector member 12 in the assembled condition, as shown in FIG. 27 to expose apertures 82, so that an attachment means such as the nap ring 58 can be positioned between urging means 70 and tubular member 1276 in a manner the same as that shown in FIG. 14 between tubular member 12 and outer flange 467 in FIG. 14, or the attachment cylindrical cover 64 as shown in FIGS. 16 and 17 can be used.

Figure 21:
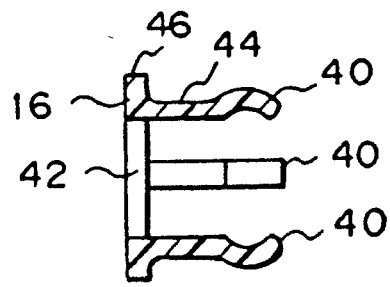
FIG. 21 is a sectional view of the retainer of FIGS. 18 to 20.
Figures 28A, 28B:
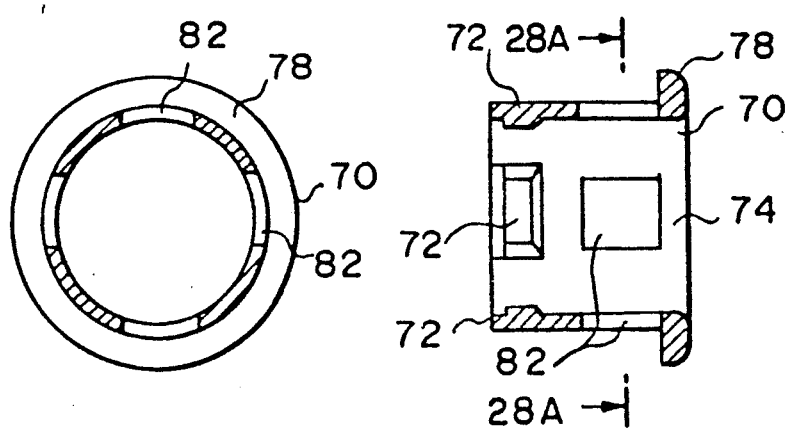
FIG. 28A is a cross-sectional vie of the urging means of FIG. 28B taken along the line A—A in FIG. 28B.
FIG. 28B is a sectional view of the urging means of FIGS. 26 and 27.
Figures 29A, 29B:
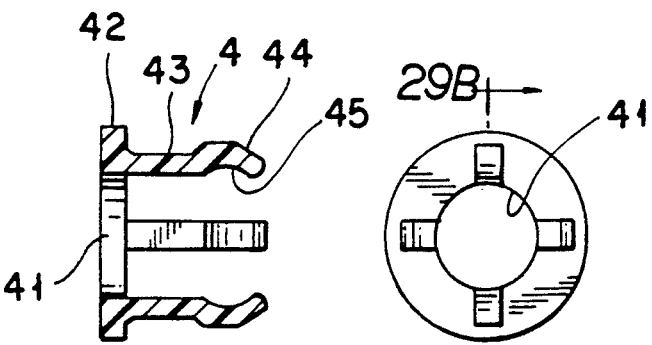
FIG. 29A, FIG. 29B, FIG. 30A, FIG. 30B, FIGS. 31 to 34, FIG. 35A, FIG. 35B, FIG. 36, FIG. 37A, FIG. 37B, FIG. 37C, FIG. 37D, FIG. 38A, FIG. 38B, FIG. 39A, FIG. 39B, FIG. 40 and FIG. 41 are various views of a modification of the snap ring and cover shown in FIG. 1 to 28.
Figures 30A, 30B:
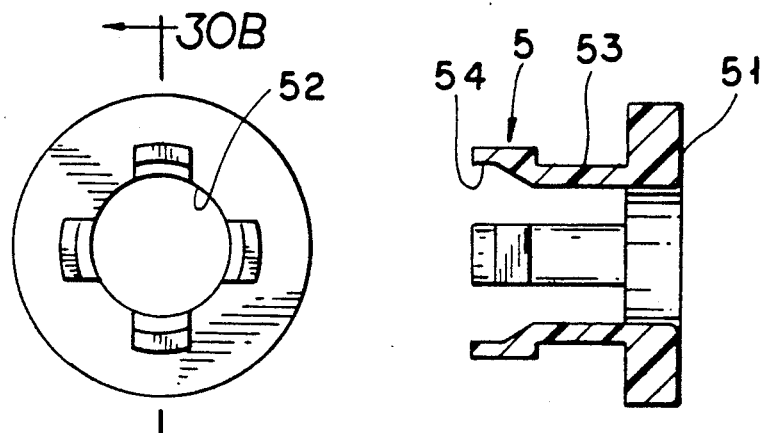
Figure 31:
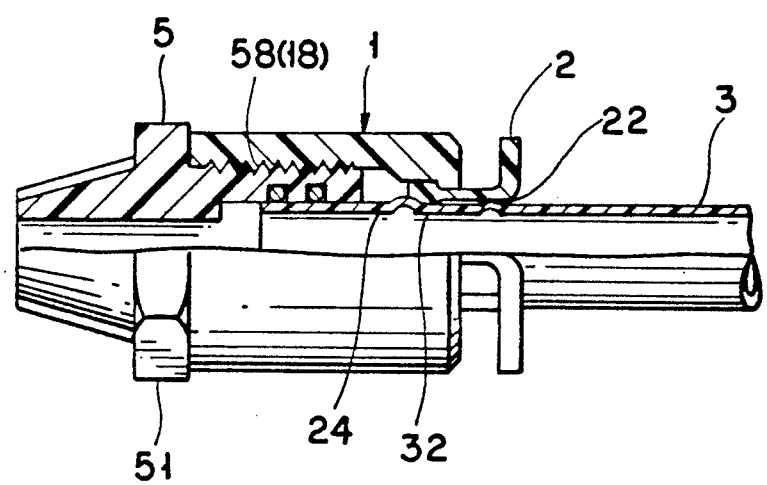
Figure 32:
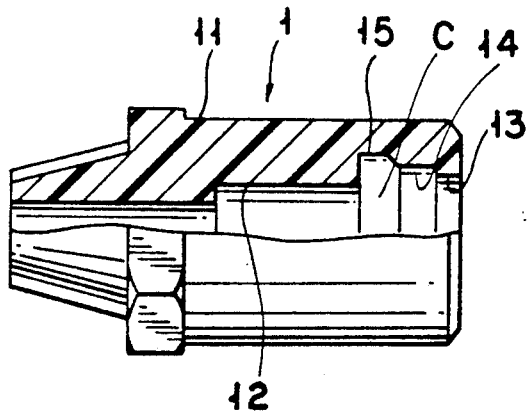
Figure 33:
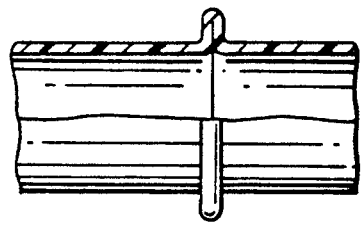
Figure 35B:
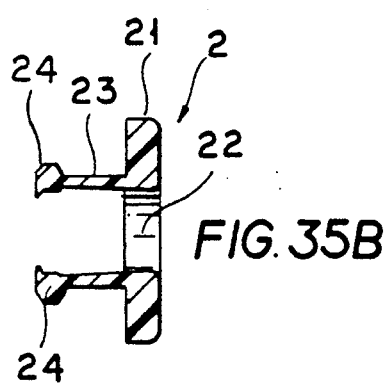
Figure 35A:
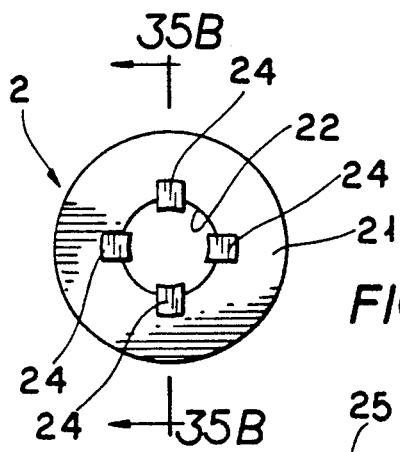
Figure 34:
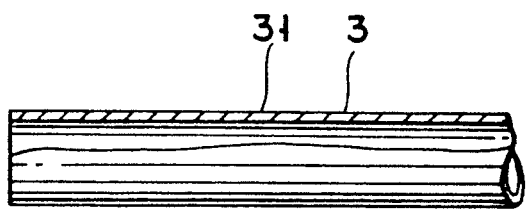
Figure 36:
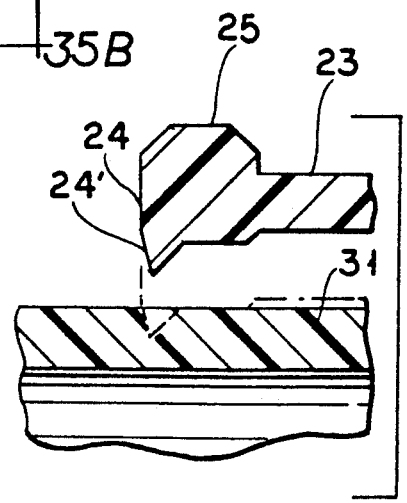
Figure 37A:
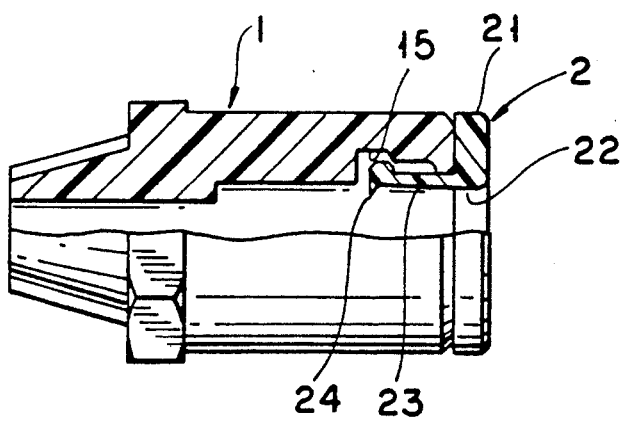
Figure 37B:
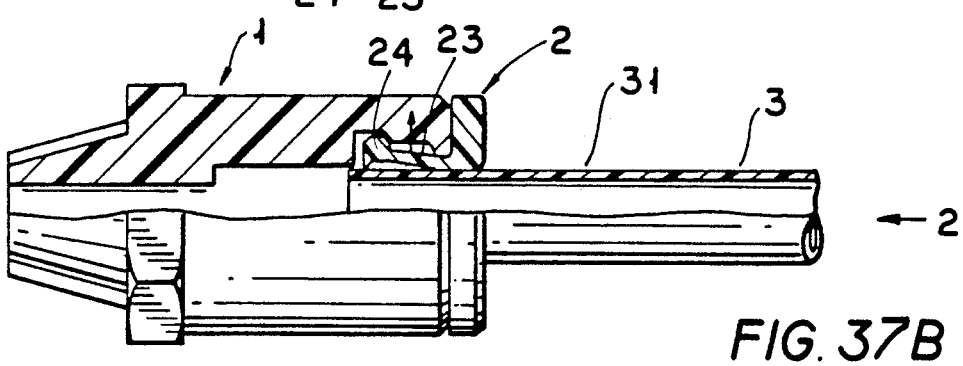
Figure 37C:
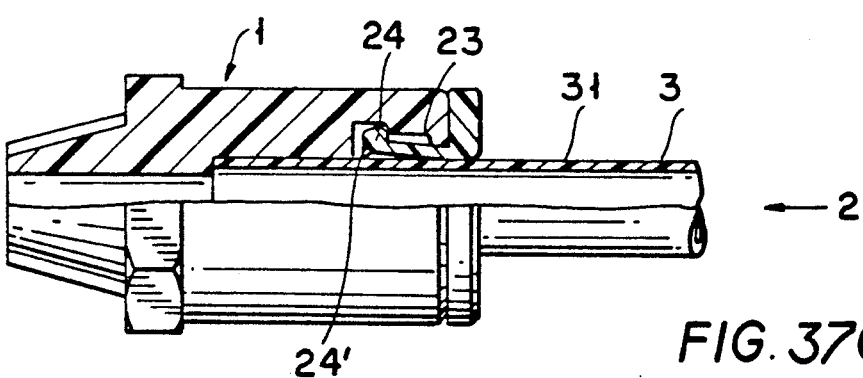
Figure 37D:
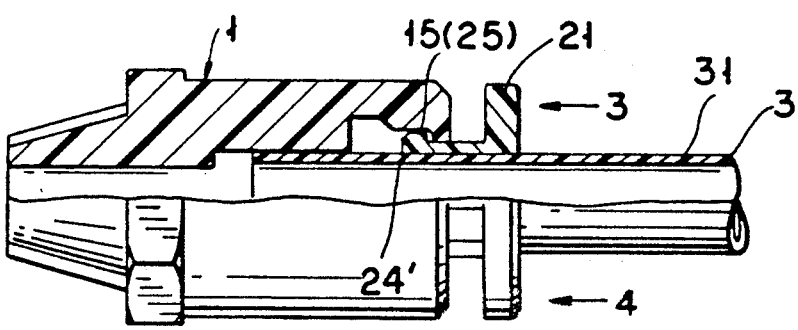
Figure 38A:
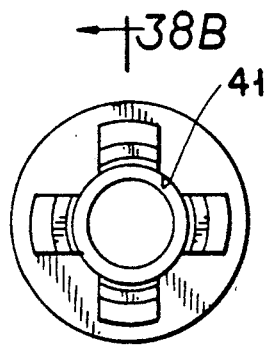
Figure 38B:
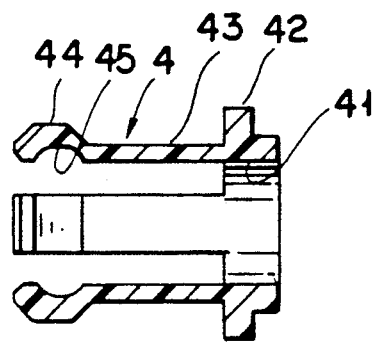
Figure 39A:
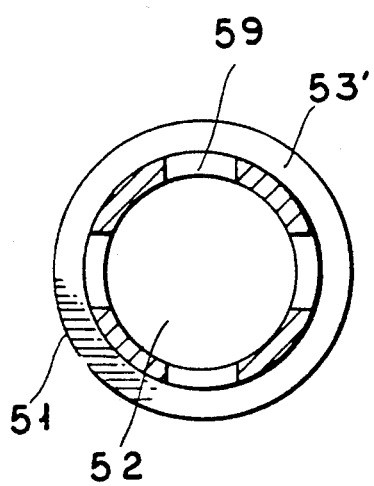
Figure 39B:
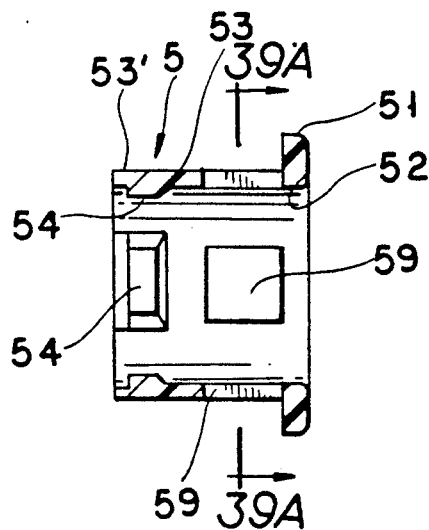
Figure 40:
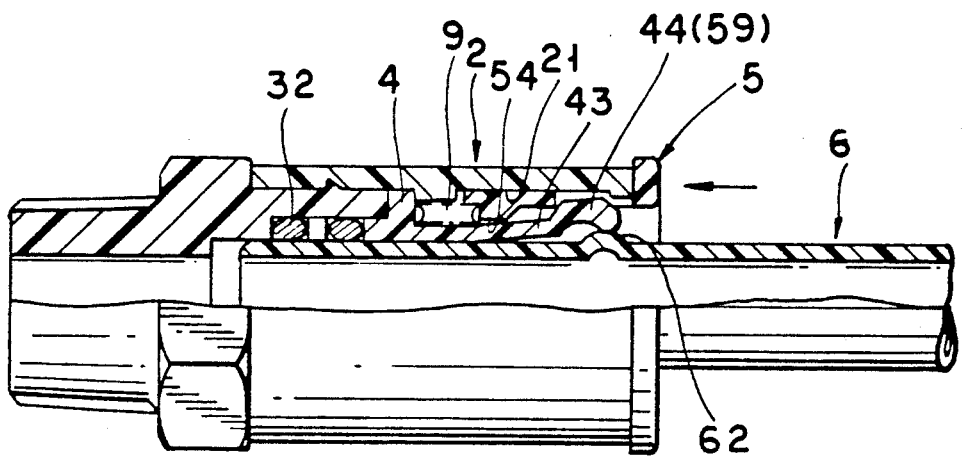
Figure 41:
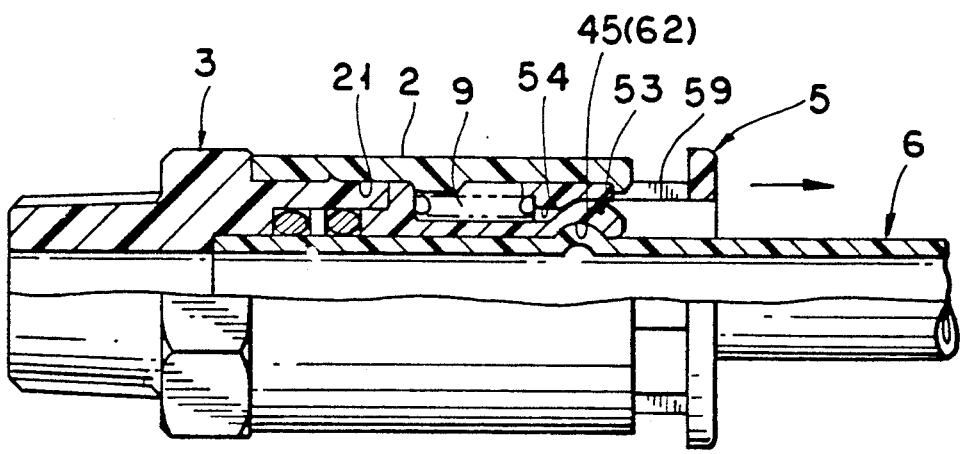

As shown in FIGS. 26 and 27, the legs 44 of the engaging members 40 are longer than those of FIGS. 18 and 21. Also, the cylindrical base portion 74 extends along the length of the urging means 70 and the engaging members 72 are provided at the free end of the cylindrical base portion 74, as shown in FIGS. 28B and 28A. The cylindrical base portion 74 of the urging means 70 has a plurality of circumferentially arranged apertures 82 in register with the engaging members 40 between the urging members 72 and the radially outer flange 78, to allow the engaging members 40 to be inserted in the apertures 82 when the urging means 70 is in the first free position, as shown in FIG. 27.

A spring 84 is provided in the first tubular connector member 12 to bias the urging means 70 toward the second engaging position. Therefore, it is necessary to manually push the urging means 70 to the first position, at the beginning of the assembly, as shown in FIG. 26. Then the second tubular connector member 14 is inserted, lifting the engaging members 40 by the annular projection 27 into the apertures 82. The urging means 70 is released when the second tubular connector member 14 reaches the shoulder 28 and is moved back by the spring 84, as shown in FIG. 27. At this position, the urging members 72 radially urge the engaging members 40 into engagement with the annular projection 27, to thereby retain the first tubular connector member 14 in the first tubular connector member 12.

I claim:

1. A swivelable connector for tubular conduits, comprising:

a first tubular connector member having a first end portion adapted to be connected to a tubular conduit and a second end portion;

a second tubular connector member having a first end portion inserted into said second end portion of said first tubular connector member, and a second end portion adapted to be connected to a further tubular conduit;

said second tubular connector member having a configured annular portion in said first end portion, said configured annular portion extending between an axially spaced first outer point and a second inner point on said first end portion of said second tubular connector member and having a diameter which reduces from said first point to said second point;

retaining means for retaining said second tubular connector member said first tubular connector member, said retaining means comprising a plurality of engaging members positionable around said annular portion of said second tubular connector member to engage with said configured annular portion and to retain said second tubular connector member against any pulling force thereon while permitting said second tubular member to freely rotate and said tubular connector members to swivel relatively to each other, and said engaging members having an inner surface facing said second tubular connector member and an outer surface;

urging means engageable with said outer surfaces of said engaging members along a relatively axial movement between said urging means and said engaging members for radially urging said engaging members into engagement with said second tubular connector member; and securing means for securing said engaging members at a predetermined axial position in said first tubular connector member when said engaging members are engaged with said second tubular connector member; and said engaging members being integrally formed with a cylindrical base portion having a center hole for passing said second tubular connector member therethrough, and extending on one side from said cylindrical base portion;

said second end portion of said first tubular connector member having a stepped inner surface comprising, in series from the outer end thereof, a first inner surface portion constituting part of said securing means and having an inner diameter, a second intermediate inner surface portion constituting part of said urging means and having an inner diameter greater than said inner diameter of said first inner surface portion, and a third inner surface portion having an inner diameter greater than said inner diameter of said second inner surface portion, and said engaging members being retractable in said third inner surface portion when said engaging members are positioned in said third inner surface portion, and said engaging members are sufficiently spaced from said second inner surface portions that they are free from sticking to said retaining member when said engaging members are positioned in said second inner surface portion to provide low friction between said retaining means and said second tubular connector member to permit said first and said second tubular connector members to freely rotate relative to each other.

2. A connector according to claim 1, wherein an annular sealing mans is provided between said first tubular connector member and said second connector member.

3. A connector according to claim 1, wherein said engaging members are movable along an axis of said first tubular connector member and pressure from said second tubular connector urging said engaging members radially outwardly to be retractable into said third inner surface portion and urged radially inwardly into contact with said second intermediate inner surface portion to engage with said annular portion when said engaging members are positioned in said second intermediate inner surface portion, and prevented from moving beyond said first inner surface portion after said engaging members are urged by said second intermediate inner surface portion constituting said urging means.

4. A connector according to claim 1, wherein said configured annular portion of said second tubular connector member comprises a part of an annular groove formed on the outer surface of said second tubular connector member.

5. A connector according to claim 1, wherein said configured annular portion of said second tubular connector member comprises a part of an annular projection formed on the outer surface of said second tubular connector member.

6. A connector according to claim 1, wherein said cylindrical base portion of said engaging members is provided with a radially outer flange for manual operation thereof.

7. A connector according to claim 6, wherein a snap ring is attached to said second tubular connector member between the outer end of said second end portion of said first tubular connector member and said radially outer flange of said cylindrical base portion of said engaging members to fill a space between said outer end of said first tubular connector member and said radially outer flange when said engaging members are urged by said second intermediate inner surface portion, and is prevented from moving beyond said first inner surface portion.

8. A connector according to claim 6, wherein an attachment cylindrical cover is attached to said radially outer flange of said cylindrical base portion, said attachment cylindrical cover having a length sufficient to extend over the outer surface of said first tubular connector member to thereby cover a space between said outer end of said first tubular connector member and said radially outer flange when said engaging members are urged by said second intermediate inner surface portion, and prevented from moving beyond said first inner surface portion.

9. A swivelable connector for tubular conduits, comprising:
   a first tubular connector member having a first end portion adapted to be connected to a tubular conduit and a second end portion;
   a second tubular connector member having a first end portion inserted in said second end portion of said first tubular connector member, and a second end portion adapted to be connected to a further tubular conduit;
   retaining means for retaining said second tubular connector member in said first tubular connector member, said retaining means comprising a plurality of engaging members positionable around said second tubular connector member and having an inner surface facing said second tubular connector member and an outer surface;
   urging means engageable with said outer surfaces of said engaging members along a relatively axial movement between said urging means and said engaging members to radially urge said engaging members into engagement with said second tubular connector member; and
   securing means for securing said engaging members at a predetermined axial position in said first tubular connector member when said engaging members are engaged with said second tubular connector member;
   said second tubular connector member having a configured annular portion in said first end portion, said configured annular portion extending between an axially spaced first outer point and a second inner point on said first end portion of said second tubular connector member and having a diameter which reduces from said first point to said second point, said engaging members being positionable around said annular portion of said second tubular connector member and being engageable with said configured annular portion to engage with and to retain said second tubular connector member against any pulling force thereon, and a diametrical portion of said diameter between said first point and said second point being engaged with said engaging members providing for low friction between said annular portion and said diametrical portion to permit said first and second tubular connector members to rotate freely relative to each other while retaining said second tubular connector member against said pulling force thereon;
   said configured annular portion of said second tubular connector member comprising a part of an annular projection formed on the outer surface of said second tubular connector member.

10. A connector according to claim 9, wherein said engaging members are integrally formed with a cylindrical base portion having a center hole for passing said second tubular connector member therethrough, and extend on one side from said cylindrical base portion.

11. A connector according to claim 9, wherein said second end portion of said first tubular connector member has a stepped inner surface comprising, in series from the outer end thereof, a first inner surface portion having an inner diameter, a second intermediate inner surface portion having an inner diameter greater than said inner diameter of said first inner surface portion and forming said diametrical portion, and a third inner surface portion having an inner diameter greater than said inner diameter of said second inner surface portion, and wherein said engaging members are movable along an axis of said first tubular connector member so that said engaging members are retractable in said third inner surface portion when said engaging members are positioned in said third inner surface portion, urged radially inwardly into contact with said second intermediate surface portion to engage with said annular portion when said engaging members are positioned in said second intermediate inner surface portion, and said second intermediate inner surface portion constituting said urging means, and being prevented from moving beyond said first inner surface portion after said engaging members are urged by said second intermediate inner surface portion constituting said urging means, said first inner surface portion constituting said securing means.

12. A swivelable connector for tubular conduits, comprising:
   a first tubular connector member having a first end portion adapted to be connected to a tubular conduit and a second end portion;
   a second tubular connector member having a first end portion inserted into said second end portion of said first tubular connector member, and a second end portion adapted to be connected to a further tubular conduit;
   said second tubular connector member having a configured annular portion in said first end portion, said configured annular portion extending between an axially spaced first outer point and a second inner point on said first end portion of said second tubular connector member and having a diameter which reduces from said first point to said second point;
   retaining means for retaining said second tubular connector member in said first tubular connector member, said retaining means comprising a plurality of engaging members positionable around said annular portion of said second tubular connector member to engage with and to retain said second tubular connector member against any pulling force thereon, and said engaging members having an inner surface facing said second tubular connector member and an outer surface;

urging means engageable with said outer surfaces of said engaging members along a relatively axial movement between said urging means and said engaging members for radially urging said engaging members into engagement with said second tubular connector member; and securing means for securing said engaging members at a predetermined axial position in said first tubular connector member when said engaging members are engaged with said second tubular connector member; and said engaging members being integrally formed with a cylindrical base portion having a center hole for passing said second tubular connector member therethrough, and extending on one side from said cylindrical base portion;

said second end portion of said first tubular connector member having a stepped inner surface and said engaging members being retractable in said second end portion of said first tubular connector member when said engaging members are positioned in said second end portion, to provide low friction between said retaining means and a portion of said stepped inner surface of said second tubular connector member to prevent said first and said second tubular members from being rotatably locked together to permit said first and said second tubular connector members to freely rotate relative to each other; and said cylindrical base portion being fixedly secured to said first tubular connector member, said urging means being movable from a first position in which said urging mans is free from said engaging members to a second position in which said urging means engages with said outer surfaces of said engaging members.

13. A connector according to claim 12, wherein said urging means comprises a plurality of urging members extending integrally from a cylindrical base portion having a center hole for passing said second tubular connector member therethrough, each of said urging members being capable of urging each of said engaging members, respectively.

14. A connector according to claim 13, wherein said cylindrical base portion of said urging means has a radially outer flange for manual operation thereof and said cylindrical base portion of said engaging members is fixed in said first tubular connector member inboard of said engaging members directed to the outer end of said first tubular connector member.

15. A connector according to claim 14, wherein said urging members at said first position are between said engaging members and the outer end of said first tubular connector member, said urging members being capable of moving toward said engaging members to urge the same.

16. A connector according to claim 14, wherein said urging members at said first position are between said engaging members and said cylindrical base portion of said engaging members, said urging members being capable of moving toward said engaging members to urge the same.

17. A connector according to claim 16, wherein a snap ring is attached on said second tubular connector member between the outer end of said second end portion of said first tubular connector member and said radially outer flange of said cylindrical base portion of said urging means to fill a space between said outer end of said first tubular connector member and said radially outer flange when said urging means is at said second position.

18. A connector according to claim 17, wherein an attachment cylindrical cover is attached on said radially outer flange of said cylindrical base portion of said urging means, said attachment cylindrical cover having a length sufficient to extend over the outer surface of said first tubular connector member to thereby cover a space between said outer end of said first tubular connector member and said radially outer flange when said urging means is at said second position.

19. A connector according to claim 16, wherein said cylindrical base portion of said urging means has a plurality of circumferentially arranged apertures between said urging members and said radially outer flange in registry with said members to allow said engaging members to be inserted in said apertures when said urging means is in said first position.

20. A connector according to claim 16, wherein a spring is provided in said first tubular connector member to bias said urging means toward said second position.

* * * * *